US012640968B2

(12) United States Patent (10) Patent No.: US 12,640,968 B2

Lesso et al. (45) Date of Patent: May 26, 2026

(54) MODULATOR CIRCUITS

(71) Applicant: Cirrus Logic International Semiconductor Ltd., Edinburgh (GB)

(72) Inventors: John P. Lesso, Edinburgh (GB); Michael Robinson, Edinburgh (GB)

(73) Assignee: Cirrus Logic Inc., Austin, TX (US)

( * ) Notice: Subject to any disclaimer, the term of this patent is extended or adjusted under 35 U.S.C. 154(b) by 0 days.

(21) Appl. No.: 18/654,041

(22) Filed: May 3, 2024

(65) Prior Publication Data

US 2025/0343714 A1 Nov. 6, 2025

(51) Int. Cl.
H04L 25/49 (2006.01)
(52) U.S. Cl.
CPC .................................. H04L 25/4902 (2013.01)
(58) Field of Classification Search
CPC .................................................... H04L 25/4902
See application file for complete search history.

(56) References Cited

U.S. PATENT DOCUMENTS 9,344,046 B2 * 5/2016 Wang ..................... H03F 3/2175

2003/0137344 A1 * 7/2003 Kimball ..................... H03F 1/34
330/9
2021/0104984 A1 * 4/2021 Lesso ....................... H03F 3/217
2022/0065645 A1 3/2022 Iwamoto et al.

OTHER PUBLICATIONS

Lamar, et al. "Circuit analysis in the frequency domain", Encyclopedia of Electrical and Electronic Power Engineering, 2023, vol. 1, pp. 636-644, https://doi.org/10.1016/B978-0-12-821204-2.00017-9. (Year: 2023).*

* cited by examiner

*Primary Examiner* — David B Lugo
(74) *Attorney, Agent, or Firm* — Jackson Walker L.L.P.

(57) ABSTRACT

This application relates to methods and apparatus for outputting a modulated signal for driving a switching output stage. A modulator circuit includes a digital modulator that receives an input signal modified by a correction signal and outputs the modulated signal. A feedback node receives a feedback signal of the output of the switching output stage and a first filter receives and filters an inverted version of the modulated signal to generate a reference signal, such that the reference signal has gain and phase matching to the feedback signal. The reference signal and the feedback signal are both applied to a summation node to generate an analog correction signal which is input to an ADC. An error loop filter is configured to filter the ADC output to generate the digital correction signal.

14 Claims, 2 Drawing Sheets

MODULATOR CIRCUITS

TECHNICAL FIELD

The field of representative embodiments of this disclosure relates to methods, apparatus and/or implementations concerning or relating to modulator circuits for switched mode amplifiers, e.g. class-D amplifiers, in particular to modulator circuits for class-D amplifiers with an error feedback configuration.

BACKGROUND

Class-D amplifiers, also referred to as switched-mode amplifiers, are used in a variety of applications and can have advantages in terms of power efficiency compared to linear amplifiers. Class-D amplifiers typically comprise a modulator circuit for receiving an input signal and generating a suitably modulated signal, e.g. a PWM (pulse-width-modulation) signal for controlling a switching output stage, which may, or may not, be integrated with the modulator. The modulator circuit may, in some implementations, be arranged with an error feedback configuration, in which an error between signals tapped before and after the output stage is determined and used to apply a correction in the forward signal path. Error feedback arrangements for class-D modulators have mainly been implemented in the digital domain, i.e. with digital feedback, as processing of analog feedback generally requires the use of relatively large components with relatively high-power consumption and good component matching and in general there is a desire for smaller and/or lower power implementations.

SUMMARY

Embodiments of the present disclosure relate to methods and apparatus for modulators for class-D amplifiers and the like that at least mitigate at least some of above-mentioned issues.

According to an aspect of the disclosure there is provided a modulator circuit for outputting a modulated signal for driving a switching output stage based on a digital input signal. The modulator circuit comprises: a digital modulator configured to receive said digital input signal modified by a digital correction signal and to output said modulated signal; a feedback node for receiving a feedback signal indicative of an output of the switching output stage; a first filter configured to receive and filter an inverted version of the modulated signal to generate a reference signal, wherein the first filter is configured, in use, such that the reference signal has gain and phase matching to the feedback signal; an analog-to-digital converter configured to receive an analog error signal indicative of any error between the reference signal and the feedback signal and output a digital error signal; and an error loop filter configured to filter the digital error signal to generate the digital correction signal; wherein the reference signal and the feedback signal are both applied to a summation node to generate the analog correction signal.

The first filter may be an adaptive filter and the modulator circuit may further comprise a filter controller for adapting one or more filter parameters of the first filter such that the reference signal has gain and phase matching to the feedback signal. The first filter may comprise an adaptive finite impulse response filter or adaptive infinite impulse response filter. The filter controller may be configured to adapt the one or more filter parameters of the first filter based on at least one of the digital error signal and the digital correction signal. The filter controller may be configured to adapt the one or more filter parameters of the first filter so as to minimise a defined signal component in the digital error signal and/or the digital correction signal. The defined signal component may comprise one of: a pilot tone signal component of the digital input signal at a defined pilot tone frequency; a pulse-width-modulation tone at a pulse-width-modulation frequency of the digital modulator; and a quantisation noise power spectrum.

In some implementations, the error loop filter may be an adaptive filter and the filter controller may be further configured to adapt the error loop filter based on said one or more filter parameters of the first filter.

In some implementations, the feedback signal received at the feedback node may be level shifted and/or attenuated by a passive level shifting and/or attenuation network.

In some implementations, the feedback signal received at the feedback node may be filtered by an output filter downstream of the switching output stage.

In some implementations, the reference signal and the feedback signal are applied to the summation node as current mode signals. The summation node may be a virtual earth node of the analog-to-digital converter.

In some implementations, the digital modulator may be a digital pulse-width-modulation modulator.

The modulator circuit may be implemented with the output stage in an amplifier system. The amplifier system may further comprise a passive level shifting and/or attenuation network for applying level shifting and/or attenuation to the feedback signal received at the feedback node. The passive level shifting and/or attenuation network applies low-pass filtering to the feedback signal. The amplifier system may further comprise an output filter configured to apply low-pass filtering to the output of the switching output stage, and the feedback signal may be taken from an output of the output filter. The first filter may be an adaptive filter and the modulator circuit may further comprise a filter controller for adapting one or more filter parameters of the first filter such that the reference signal has gain and phase matching to the feedback signal. The error loop filter may also be an adaptive filter and the filter controller may be further configured to adapt the error loop filter based on said one or more filter parameters of the first filter.

In another aspect there is provide a modulator circuit for outputting a modulated signal for driving a switching output stage based on a digital input signal, the modulator circuit comprising: a forward signal path configured to combine the digital input signal with a correction signal and generate the modulated signal, an error path configured to generate the correction signal based on an error signal indicated of an error between a reference signal and a feedback signal indicative of an output switching output stage; wherein the reference signal comprises an inverted version of the modulated signal which is phase and gain matched to the feedback signal and the error signal is generated by applying the reference signal and the feedback signal to a summation node.

In another aspect there is provide a modulator circuit for outputting a modulated signal for driving a switching output stage based on a digital input signal, the modulator circuit comprising: a feedback node configured to receive a feedback signal indicative of an output of the switching output stage; a reference signal path configured to generate a reference signal as an inverted and filtered version of the modulated signal with a delay matched to the feedback signal; wherein the modulator circuit is configured to combine the reference signal with the feedback signal to generate an error signal and to apply a correction to the digital input signal based on said error signal.

It should be noted that, unless expressly indicated to the contrary herein or otherwise clearly incompatible, then any feature described herein may be implemented in combination with any one or more other described features.

BRIEF DESCRIPTION OF DRAWINGS

For a better understanding of examples of the present disclosure, and to show more clearly how the examples may be carried into effect, reference will now be made, by way of example only, to the following drawings in which.

DESCRIPTION OF EMBODIMENTS

The description below sets forth example embodiments according to this disclosure. Further example embodiments and implementations will be apparent to those having ordinary skill in the art. Further, those having ordinary skill in the art will recognize that various equivalent techniques may be applied in lieu of, or in conjunction with, the embodiments discussed below, and all such equivalents should be deemed as being encompassed by the present disclosure.

Figure 1:
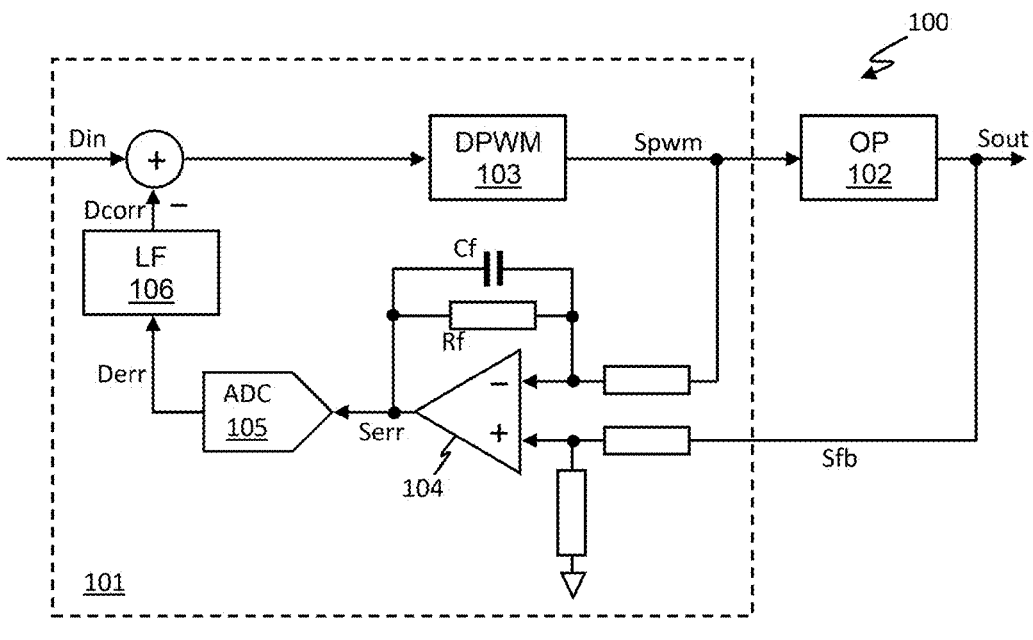
FIG. 1 illustrates one example of a class-D amplifier system with analog feedback.

FIG. 1 illustrates one example of a class-D amplifier system 100 that has been previously proposed to implement an error feedback arrangement. The amplifier system 100 comprises a modulator circuit 101 configured to receive a digital input signal Din and to generate a modulated signal, Spwm, for driving switching output stage 102, e.g. a class-D output stage, to generate an output signal Sout for driving a load (not illustrated in FIG. 1).

In the example of FIG. 1, the modulator circuit 101 comprises a digital modulator 103, which in this example is a digital PWM (pulse-width-modulation) modulator, which is arranged to receive the digital input signal Din, as modified by a digital correction signal Dcorr, and provide a digital PWM signal as the modulated signal Spwm for driving the output stage 102. To generate the digital correction signal Dcorr, an analog feedback signal Sfb, indicative of the output signal Sout, is fed-back to one input of op-amp 104 whilst the modulated signal Spwm is provided to the other input of the op-amp 104. The feedback signal Sfb and modulated signal Spwm may be supplied to the respective inputs of the op-amp 104 via suitable resistances, which may be configured to provide any level shifting as needed. The op-amp 104 is configured with a parallel connection of a feedback capacitance Cf and feedback resistance Rf and provides subtraction and filtering of its input signals to provide a signal Serr indicative of any error between Spwm and Sfb. This error signal Serr is digitized by ADC (analog-to-digital converter) 105 and the digital error signal Derr output from the ADC 105 is filtered by error loop-filter 106 to provide the digital correction signal Dcorr at the correct level so as to cancel the error in the output signal Sout, i.e. so that the correction signal, when subject to the transfer function of the forward signal path, correctly cancels the error at the output.

The arrangement of FIG. 1 generally requires the op-amp 104 to be a high-performance op-amp with accurately matched components to be able to accurately determine the error signal Serr to be passed to the ADC 105. As will be understood by one skilled in the art, the operation of the digital PWM modulator will introduce PWM tones and quantisation noise into the modulated signal Spwm, and hence into the output signal Sout. The quantisation noise will be high-frequency noise, out of the signal band of interest, but such quantisation noise and PWM tones will be present in the feedback signal Sfb received at one input of the op-amp, as well as in the modulated signal Spwm. This requires significant filtering of the inputs of the op-amp to avoid the risk of quantisation noise or PWM tones in the error signal from mixing down into the signal band of interest and/or resulting in non-linear behaviour in the ADC 105. This therefore requires a wide bandwidth, high-power, op-amp to be used for op-amp 104, which may thus require a relatively large circuit area and may consume a relatively large amount of power in use. Furthermore, as the modulated signal Spwm which is output from the digital PWM modulator is effectively used as a reference for determining the error in the feedback signal, the digital PWM modulator must be able to drive the input resistor of the op-amp 104 with a required degree of linearity and noise performance. In addition, the loop delay due to the op-amp 104 and the filtering required can restrict the maximum loop gain of the error loop for correcting the error and the noise floor of the system may depend on the noise of the op-amp 104 and associated input resistances.

Embodiments of the present disclosure provide modulator circuits for a class-D amplifier system which at least mitigate at least some of these issues.

Figure 2:
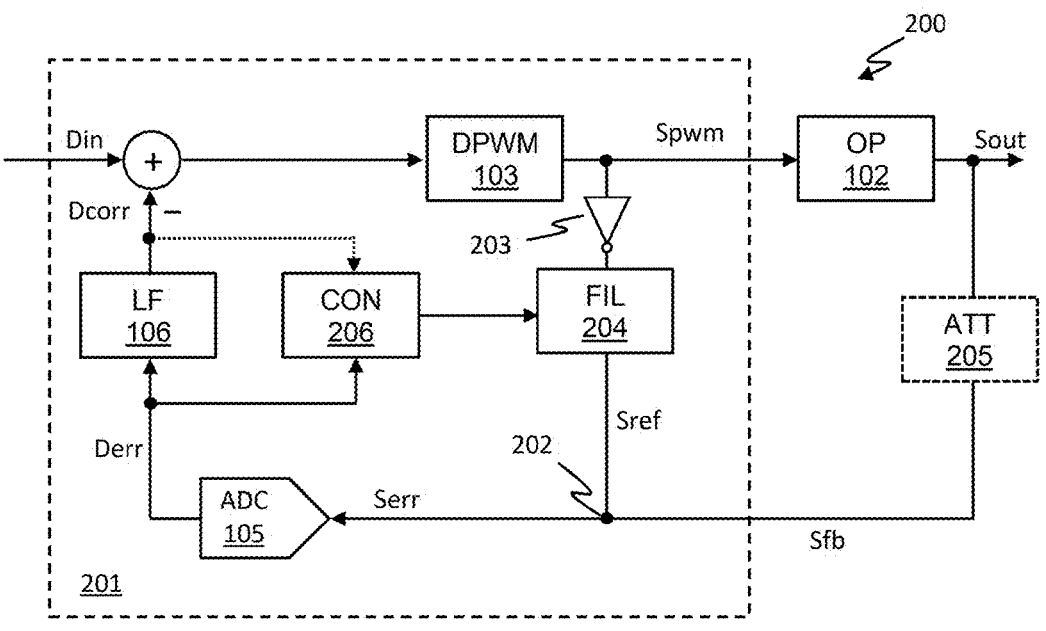
FIG. 2 illustrates one example of a class-D amplifier system with a modulator circuit implementing error feedback according to an embodiment.

FIG. 2 illustrates an example of a class-D amplifier system 200 that includes a modulator circuit 201 with error feedback according to an embodiment, in which similar components to those discussed with reference to FIG. 1 are identified by the same references. The modulator circuit 201 of FIG. 2 again comprises a digital modulator 103, e.g. a digital PWM modulator, configured to receive a digital input signal Din as modified by a digital correction signal Dcorr and to generate a modulated signal, Spwm, for driving a class-D output stage.

For audio applications, the digital input signal Din may be an audio signal and the output stage 102 may be configured to provide an output signal Sout for driving an audio output transducer (not illustrated in FIG. 2), such as a loudspeaker. The output stage 102 may be any suitable switching output stage for modulating at least one output node between selected switching voltages with a duty cycle defined by the modulated signal Spwm, and could, for example, be a half-bridge output stage for driving the transducer in a single-ended configuration or could be a full-bridge output stage for driving the transducer in a bridge-tied-load configuration, as would be understood by one skilled in the art. Embodiments of the present disclosure are suitable for audio applications, but it will be understood that the disclosure is not limited to audio and a modulator circuit according to an embodiment could be used in other applications as part of a class-D or switched mode driver for driving some other type of load.

The output stage 102 may be integrated with the modulator circuit 201 as part of the same integrated circuit (IC), i.e. the output stage 102 may be on-chip with the modulator circuit 201. In some implementations, however, the output stage 102 may be formed as part of a separate integrated circuit to the modulator circuit 201, with the modulator circuit IC having suitable connections for connecting to the output stage IC, possibly as part of the same IC package or as separate IC packages in a host device. For instance, for some applications there may be advantages in implementing the modulator circuit 201 as part of an IC formed using conventional silicon processing technologies, whilst using compound semiconductor processing, e.g. GaN processing, for the IC for the output stage 102.

In the modulator circuit 201 of FIG. 2, a feedback signal Sfb indicative of the output signal Sout is received and passed to a summation node 202. This feedback signal Sfb may be tapped from the output of the output stage 102 or may be tapped from the output path downstream of the output stage so as to include any effects of the downstream output path, such as filtering as will be discussed in more detail below.

A reference signal, derived from the modulated signal Spwm output from the digital PWM modulator 103, is also supplied to the summation node 202. To generate the reference signal, the modulated signal Spwm is inverted by inverter 203 and then filtered by filter 204. The inverter 203 effectively converts a signal +s to a signal −s, and thus supplies a negative version of the modulated signal Spwm to the filter 204 and inversion of the digital PWM signal Spwm is relatively straightforward. The filter 204 provides filtering of this inverted signal to provide gain and phase matching to the feedback signal Sfb and supplies the reference signal Sref to the summation node. The reference signal Sref is thus a version of the inverse of the modulated signal Spwm, with a delay and gain matched to that of the feedback signal, i.e. so that a given variation in the signal content of the modulated signal Spwm would lead to a corresponding variation in the reference signal which is matched in magnitude and timing to the resultant variation in the feedback signal (but which is inverted in the reference signal). In effect, the reference signal Sref can be seen as a negative version of the output signal that would be expected, given the modulated signal Spwm, if produced by an ideal output stage without any error.

This reference signal Sref is applied to the summation node 202 and given the reference signal has the same PWM tones and quantisation noise as will appear in the output signal Sout, but inverted, the PWM tones and quantisation noise in the signal Sref cancel those in the feedback signal Sfb. Thus, the quantisation noise introduced by the digital PWM modulator 103, which is present in the output signal Sout and hence in the feedback signal Sfb, is cancelled at the summation node 202 by the combination with the reference signal Sref, which is an inverted version of the Spwm signal with the same quantisation noise. This cancellation of the quantisation noise and PWM tones at the summation node 202 thus significantly reduces the amount of out-of-band power in the signal and can avoid the need for filtering of the error signal to remove such quantisation noise/PWM tones. Avoiding the requirement for filtering to remove the PWM tones/quantisation noise can thus avoid the associated filter delay and allow for a higher loop gain, whilst also avoiding the need for relatively high-power and/or large circuit components. This also reduces the performance requirements for the reference signal, and hence the digital modulator 103.

Note in the example of FIG. 2 an inverter 203 is used in the reference signal path to provide inversion so that the reference signal Sref is inverted with respect to the modulated signal Spwm. In theory, however, the inverter 203 could be located in the forward signal path downstream of the digital PWM modulator and the modulated signal prior could be tapped from before the inverter to provide the reference signal which is inverted with respect to the feedback signal. Generally however it would be preferred to avoid unnecessary components in the main forward signal path. In some implementations, the depending on the driving of the output stage based on the modulated signal, the output stage or the feedback path may effectively apply inversion, in which case there may not be a need for any specific inverter.

The signals Sref and Sfb are thus both applied to a summation node 202 and no active components are required for summation of these signals, which is advantageous in terms of circuit area and power consumption. Advantageously, the signals Sref and Sfb may be configured as current signals so the summation is provided by current summation, which can be achieved, as illustrated, without the need for any passive components for summation, which again allows for area and power savings, although it will be understood that other arrangements for summation of these signals could be implemented.

However, in some cases, for example where the output signal Sout generated by the output stage 102 is a relatively high-power output signal, it may be advantageous to apply to some level shifting and/or attenuation, so that the feedback signal Sfb is received at the modulator circuit 201 at a suitable signal level that does not require the use of components with a high voltage tolerance. Thus, in some implementations, there may be a level shifting and/or attenuation network, which may in this example be an attenuation network 205, in the feedback path for the feedback signal Sfb, which may be external, i.e. off-chip, to the modulator circuit 201. The attenuation network 205 may comprise a network of suitable passive components, such as a network of resistances and/or capacitances, as would be understood by one skilled in the art. Feedback signal Sfb which is supplied to the summation node may thus be a level-shifted, e.g. attenuated, version of the output signal, with the reference signal Sref from filter 204 being suitably gain matched to this feedback signal.

The error signal Serr is supplied to an ADC 105 and may be supplied directly to the ADC 105 without any further filtering and without requiring the ADC 105 to be a particularly high-performance ADC, as would be the case if there was significant out-of-band power, e.g. quantisation noise, in the error signal Serr, although in some cases, if the ADC does not have inherent anti-aliasing filtering, there may be some anti-aliasing filtering applied to account for any high frequency noise that might couple into the ADC input from external sources. As noted above, the signals Sref and Sfb may be configured as current mode signals which are supplied to a virtual earth node of the ADC, which may be a virtual earth input node or the ADC or a virtual earth node of a first integrator of the ADC. The ADC 105 may be any suitable ADC and may, in some applications, be a continuous time ADC, and in particular may be a continuous time sigma-delta ADC which has inherent anti-aliasing filtering at its front end. The digital error signal Derr from the ADC 105 can be filtered by error loop filter 106 to provide the correction signal Dcorr in a similar manner as discussed with reference to FIG. 1.

By inverting the modulated signal Spwm and filtering the inverted signal to provide gain and phase matching to the feedback signal Sfb, the PWM tones/quantisation noise in the feedback signal Sfb can thus be cancelled without requiring the use of high-power active components and without requiring significant filtering that limits the achievable loop gain.

To provide the correct gain and phase matching, in at least some embodiments, the filter 204 may be implemented as an adaptive filter, for example an adaptive finite impulse response (AFIR) filter or infinite impulse response filter (IIR), with one or more filter parameters of the filter 204 being adapted by a filter controller 206. The filter controller 206 may be configured to adapt the parameters, e.g. the coefficients or weightings, of the filter 204 to minimize any component in the error signal Serr which corresponds to signal content of the digital input signal Din or the modulated signal Spwm. It will be understood that if the filter 204 has the correct gain and phase matching, any signal content in the modulated signal Spwm, and hence inverted in the reference signal Sref, which is correctly reproduced in the output signal Sout, should cancel and thus the error signal will comprise just the error component of the output signal Sout. However, if the gain and/or phase does not match correctly, the signal content will not cancel entirely and there will be at least some signal content of the modulated signal Spwm in the error signal. The filter controller 206 may thus receive the digital error signal Derr which is output from the ADC 105 and adapt the filter 204 accordingly to minimize the extent of any non-error signal content, but in some implementations the filter controller 206 could additionally or alternatively receive the digital correction signal Dcorr as filtered by the loop filter 106.

In some implementations, the digital signal Din could comprise some known signal content which is specifically included to allow for adaptation of the filter 204, for instance the digital input signal Din could comprise a pilot tone at a defined pilot tone frequency, which may be out of the signal band of interest, for instance above or below the audible frequency band for audio applications. The filter controller 206 may then specifically look for any component in the error signal that corresponds to this known signal content, i.e. to look for any component at the pilot tone frequency, and may adapt the filter 204 to minimise the extent of this component in the error signal Scorr. Such a pilot tone could be added to the digital signal in a generally continuous manner, so as to allow for relatively constant monitoring, but in some cases a pilot tone could be added only at certain times for calibration of the filter 204, e.g. as part of a start-up or reset process.

In some implementations, however, it may be preferable not to add a pilot tone or similar to the digital input signal Din for the purposes of adaptation of the filter 204, at least on a continuous basis, in which case the filter controller 206 may be configured to adapt the filter 204 based on some inherent signal content. For instance, the filter controller 206 may be configured to determine the extent of any residual signal component at the PWM tone frequency in the error signal Serr and adapt the filter 204 to minimise any such residual signal component. Additionally or alternatively, the filter controller 206 could adapt the filter 204 based on the quantisation noise spectrum, i.e. to adapt the filter to minimise any out-of-band power or to otherwise match the noise spectrum to that which would be expected with correct cancellation.

In some implementations, the filter controller 206 may be configured to monitor the relevant signal content in the error signal Serr (by monitoring the digital error signal or digital correction signal Dcorr as appropriate) on a relatively continuous basis, and the filter 204 may be adapted by the filter controller 206 as required on such a relatively continuous basis. However, in some implementations, whilst the monitoring may be relatively continuous, the filter controller 206 may be configured to, after an initial adaptation on start-up, only apply adaption periodically and/or if the relevant monitored signal content crosses some threshold, i.e. the filter 204 may not be adapted in a continuous manner by the filter controller 206, but only on a periodic basis or when it is determined that some adaptation is required to maintain the filter performance within a defined tolerance.

As well as providing the correct phase and gain matching of the reference signal Sref to the feedback signal Sfb, the filter 204 will generally provide some low pass filtering of the reference signal Sref. If the feedback signal Sfb is also subjected to some low pass filtering, this can advantageously reduce the jitter sensitivity of the digital PWM modulator 103. The attenuation network 205, if present, may inherently provide, or may be configured to provide, some low pass filtering of the feedback signal and hence provide this advantage of reduced jitter sensitivity, without requiring any additional filtering. In some implementations, however, a separate low-pass filer could be implemented in the feedback path, either as an external, i.e. off-chip, filter to the modulator circuit 201 or as part of the modulator 201, although, as noted above, filtering delay applied in the feedback path can impact on the error loop gain and thus there may be a trade-off between jitter sensitivity and loop gain.

In some implementations, there may be some filtering applied to the output signal Sout generated by the output stage 102 in the downstream path to the load. For instance, in some applications, it may be beneficial to have an output filter for applying low-pass filtering of the output signal Sout. Often such an output filter may be implemented as an LC filter, with an inductor (L) in series in the output path and a capacitor (C) connected between the signal path and a defined voltage, as will be understood by one skilled in the art.

When such an output filter is present, the feedback signal Sfb may be tapped from the output path of the output stage 102 upstream of the output filter. In some implementations, however, the output filter may be included within the error loop.

Figure 3:
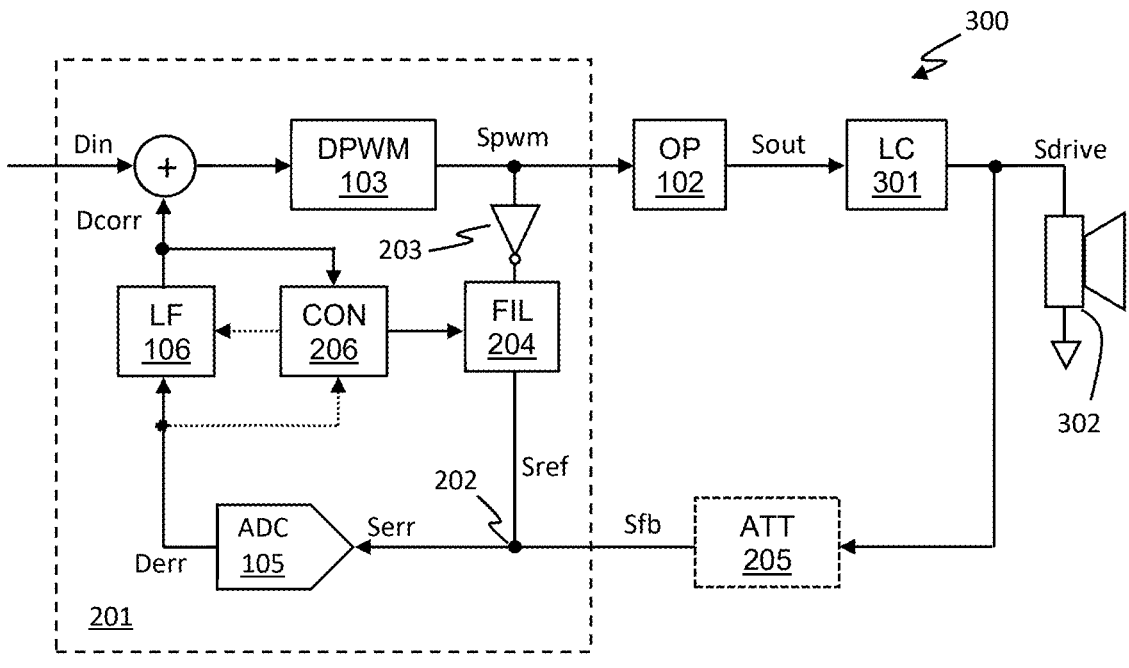
FIG. 3 illustrates a further example of a class-D amplifier system with a modulator circuit according to an embodiment.

FIG. 3 illustrates an example of a class-D amplifier system 300, in which similar components as discussed with reference to FIG. 2 are identified by the same references. The amplifier system 300 includes an output LC filter 301 in the output path between the output stage 102 and the load 302, which filters the output signal Sout from the output stage 102 to provide a drive signal Sdrive for driving the load 302. The feedback signal Sfb is tapped from the drive signal Sdrive, downstream of the LC filter 301.

The modulator circuit 201 acts in a similar manner as described with reference to FIG. 2 and thus the filter controller 206 adapts the filter 204 so that the reference signal Sref output from the filter 204 is gain and phase matched to the feedback signal Sfb, which is the output signal Sout as filtered by the LC filter 301 (and attenuated by the attenuation network 205, if present). Inclusion of the loop filter within the error loop thus means that the operation of the error loop suppresses the non-linearity due to the LC filter, i.e. the error loop operates to correct the error in the drive signal Sdrive which actually drives the load 301, which can thus improve performance.

In the example of FIG. 3, the error loop filter 106 will generally be configured to take the transfer function of the LC filter 301 into account. As discussed with reference to FIG. 1, the error loop filter 106 is generally configured to filter the digital error signal to provide a correction signal Dcorr which is at the correct level to cancel the determined error at the monitored output. In the example of FIG. 2, the error is determined in the output signal Sout from the output stage 102 and the correction signal Dcorr is applied, taking into account the transfer function of the forward signal path to this point. In the example of FIG. 3, the error which is determined is effectively the error in the drive signal Sdrive and the error loop filter 106 thus applies the correction signal at a correct level to cancel this error, taking into account the transfer function of the forward signal path including the LC filter 301. In this case, given the transfer function of the LC filter 301 may exhibit a greater variability than the rest of the forward signal path, in some embodiments, it may be advantageous for the error loop filter 106 to also be adaptable and for the filter controller 206 to also adapt the error loop filter 106. As noted above, the adaption of the filter 204 is to provide matching for the combined transfer function of the output stage 102 and LC filter 301 and thus the adaption of the error loop filter 106 can be based on the adaptation of filter 204. Note, principle of adapting the error loop filter 106 based on, or together with, adaption of the filter 204 could also be applied to the example of FIG. 2, if desired.

Embodiments of the present disclosure thus provide modulator circuits for driving a switched-mode output stage that implement an error feedback configuration. Modulator circuits according to the embodiments described herein can be seen as hybrid digital-analog modulator with error feedback, as the forward signal path can be digital, but the feedback signal is analog and analog combination of the feedback signal with a filtered version of the modulated signal are used to provide cancellation of PWM tones/quantisation noise.

Embodiments may be implemented as an integrated circuit. Embodiments may be implemented in a host device, which may be a portable and/or battery powered host device such as a mobile computing device for example a laptop, notebook or tablet computer, or a mobile communication device such as a mobile telephone, for example a smartphone. The device could be a wearable device such as a smartwatch. The host device could be a games console, a remote-control device, a home automation controller or a domestic appliance, a toy, a machine such as a robot, an audio player, a video player. It will be understood that embodiments may be implemented as part of a system provided in a home appliance or in a vehicle. There is further provided a host device incorporating the above-described embodiments.

The skilled person will recognise that some aspects of the above-described apparatus and methods may be embodied as processor control code, for example on a non-volatile carrier medium such as a disk, CD- or DVD-ROM, programmed memory such as read only memory (Firmware), or on a data carrier such as an optical or electrical signal carrier. For some applications, embodiments may be implemented on a DSP (Digital Signal Processor), ASIC (Application Specific Integrated Circuit) or FPGA (Field Programmable Gate Array). Thus, the code may comprise conventional program code or microcode or, for example code for setting up or controlling an ASIC or FPGA. The code may also comprise code for dynamically configuring re-configurable apparatus such as re-programmable logic gate arrays. Similarly, the code may comprise code for a hardware description language such as Verilog™ or VHDL (Very high-speed integrated circuit Hardware Description Language). As the skilled person will appreciate, the code may be distributed between a plurality of coupled components in communication with one another. Where appropriate, the embodiments may also be implemented using code running on a field-(re)

programmable analogue array or similar device in order to configure analogue hardware.

It should be noted that the above-mentioned embodiments illustrate rather than limit the invention, and that those skilled in the art will be able to design many alternative embodiments without departing from the scope of the appended claims. The word "comprising" does not exclude the presence of elements or steps other than those listed in a claim, "a" or "an" does not exclude a plurality, and a single feature or other unit may fulfil the functions of several units recited in the claims. Any reference numerals or labels in the claims shall not be construed so as to limit their scope.

As used herein, when two or more elements are referred to as "coupled" to one another, such term indicates that such two or more elements are in electronic communication or mechanical communication, as applicable, whether connected indirectly or directly, with or without intervening elements.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative. Accordingly, modifications, additions, or omissions may be made to the systems, apparatuses, and methods described herein without departing from the scope of the disclosure. For example, the components of the systems and apparatuses may be integrated or separated. Moreover, the operations of the systems and apparatuses disclosed herein may be performed by more, fewer, or other components and the methods described may include more, fewer, or other steps. Additionally, steps may be performed in any suitable order. As used in this document, "each" refers to each member of a set or each member of a subset of a set.

Although exemplary embodiments are illustrated in the figures and described below, the principles of the present disclosure may be implemented using any number of techniques, whether currently known or not. The present disclosure should in no way be limited to the exemplary implementations and techniques illustrated in the drawings and described above.

Unless otherwise specifically noted, articles depicted in the drawings are not necessarily drawn to scale.

All examples and conditional language recited herein are intended for pedagogical objects to aid the reader in understanding the disclosure and the concepts contributed by the inventor to furthering the art, and are construed as being without limitation to such specifically recited examples and conditions. Although embodiments of the present disclosure have been described in detail, it should be understood that various changes, substitutions, and alterations could be made hereto without departing from the spirit and scope of the disclosure.

Although specific advantages have been enumerated above, various embodiments may include some, none, or all of the enumerated advantages. Additionally, other technical advantages may become readily apparent to one of ordinary skill in the art after review of the foregoing figures and description.

To aid the Patent Office and any readers of any patent issued on this application in interpreting the claims appended hereto, applicants wish to note that they do not intend any of the appended claims or claim elements to invoke 35 U.S.C. § 112 (f) unless the words "means for" or "step for" are explicitly used in the particular claim.

The invention claimed is:

1. A modulator circuit for outputting a modulated signal for driving a switching output stage based on a digital input signal, the modulator circuit comprising:

a digital modulator configured to receive said digital input signal modified by a digital correction signal and to output said modulated signal;

a feedback node for receiving a feedback signal indicative of an output of the switching output stage;

a first filter configured to receive and filter an inverted version of the modulated signal to generate a reference signal, wherein the first filter is configured, in use, such that the reference signal has gain and phase matching to the feedback signal;

an analog-to-digital converter configured to receive an analog error signal indicative of any error between the reference signal and the feedback signal and output a digital error signal; and an error loop filter configured to filter the digital error signal to generate the digital correction signal;

wherein the reference signal and the feedback signal are both applied to a summation node to generate the analog correction signal;

wherein the first filter is an adaptive filter and the modulator circuit further comprises a filter controller for adapting one or more filter parameters of the first filter such that that the reference signal has gain and phase matching to the feedback signal; and wherein the filter controller is configured to adapt said one or more filter parameters of the first filter based on at least one of the digital error signal and the digital correction signal.

2. The modulator circuit of claim 1 wherein the first filter comprises an adaptive finite impulse response filter or adaptive infinite impulse response filter.

3. The modulator circuit of claim 1 wherein the filter controller is configured to adapt said one or more filter parameters of the first filter so as to minimise a defined signal component in the digital error signal and/or the digital correction signal, wherein said defined signal component comprises one of:

a pilot tone signal component of the digital input signal at a defined pilot tone frequency;

a pulse-width-modulation tone at a pulse-width-modulation frequency of the digital modulator; and a quantisation noise power spectrum.

4. The modulator circuit of claim 1 configured such that said feedback signal received at the feedback node is level shifted and/or attenuated by a passive level shifting and/or attenuation network.

5. The modulator circuit of claim 1 configured such that said feedback signal received at the feedback node is filtered by an output filter downstream of the switching output stage.

6. The modulator circuit of claim 1 wherein the reference signal and the feedback signal are applied to the summation node as current mode signals.

7. The modulator circuit of claim 6 wherein said summation node is a virtual earth node of the analog-to-digital converter.

8. The modulator circuit of claim 1 wherein the digital modulator is a digital pulse-width-modulation modulator.

9. An amplifier system comprising the modulator circuit of claim 1 and said output stage.

10. The amplifier system of claim 9 further comprising a passive level shifting and/or attenuation network for applying level shifting and/or attenuation to the feedback signal received at the feedback node.

11. The amplifier system of claim 10 wherein the passive level shifting and/or attenuation network applies low-pass filtering to the feedback signal.

12. The amplifier system of claim 10 further comprising an output filter configured to apply low-pass filtering to the output of the switching output stage, wherein said feedback signal is taken from an output of the output filter.

13. A modulator circuit for outputting a modulated signal for driving a switching output stage based on a digital input signal, the modulator circuit comprising:

a digital modulator configured to receive said digital input signal modified by a digital correction signal and to output said modulated signal;

a feedback node for receiving a feedback signal indicative of an output of the switching output stage;

a first filter configured to receive and filter an inverted version of the modulated signal to generate a reference signal, wherein the first filter is configured, in use, such that the reference signal has gain and phase matching to the feedback signal;

an analog-to-digital converter configured to receive an analog error signal indicative of any error between the reference signal and the feedback signal and output a digital error signal; and an error loop filter configured to filter the digital error signal to generate the digital correction signal;

wherein the reference signal and the feedback signal are both applied to a summation node to generate the analog correction signal;

wherein the first filter is an adaptive filter and the modulator circuit further comprises a filter controller for adapting one or more filter parameters of the first filter such that the reference signal has gain and phase matching to the feedback signal; and wherein the error loop filter is an adaptive filter and the filter controller is further configured to adapt the error loop filter based on said one or more filter parameters of the first filter.

14. An amplifier system comprising:

a switching output stage;

a modulator circuit for outputting a modulated signal for driving the switching output stage based on a digital input signal, the modulator circuit comprising:

a digital modulator configured to receive said digital input signal modified by a digital correction signal and to output said modulated signal;

a feedback node for receiving a feedback signal indicative of an output of the switching output stage;

a first filter configured to receive and filter an inverted version of the modulated signal to generate a reference signal, wherein the first filter is configured, in use, such that the reference signal has gain and phase matching to the feedback signal;

an analog-to-digital converter configured to receive an analog error signal indicative of any error between the reference signal and the feedback signal and output a digital error signal; and an error loop filter configured to filter the digital error signal to generate the digital correction signal;

wherein the reference signal and the feedback signal are both applied to a summation node to generate the analog correction signal;

a passive level shifting and/or attenuation network for applying level shifting and/or attenuation to the feedback signal received at the feedback node; and an output filter configured to apply low-pass filtering to the output of the switching output stage, wherein said feedback signal is taken from an output of the output filter;

wherein the first filter is an adaptive filter and the modulator circuit further comprises a filter controller for adapting one or more filter parameters of the first filter such that the reference signal has gain and phase matching to the feedback signal, and wherein the error loop filter is also an adaptive filter and the filter controller is further configured to adapt the error loop filter based on said one or more filter parameters of the first filter.

\* \* \* \* \*